June 26, 1934.  C. W. GORDON ET AL  1,964,051
METHOD OF MAKING TUBULAR SUPERHEATER ELEMENTS
Filed Aug. 8, 1932  7 Sheets-Sheet 1
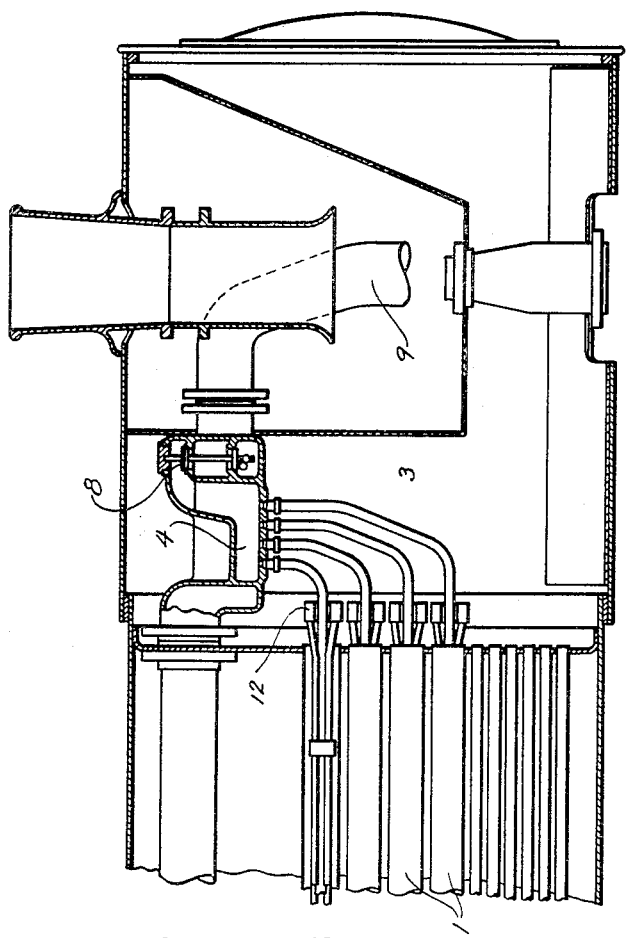
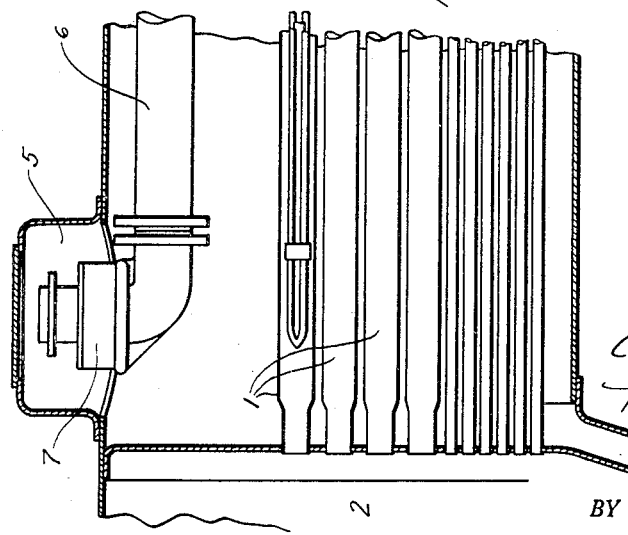
Fig. 1.
Charles W. Gordon
Thomas F. Birmingham
INVENTORS
BY O. V. Rice
ATTORNEY

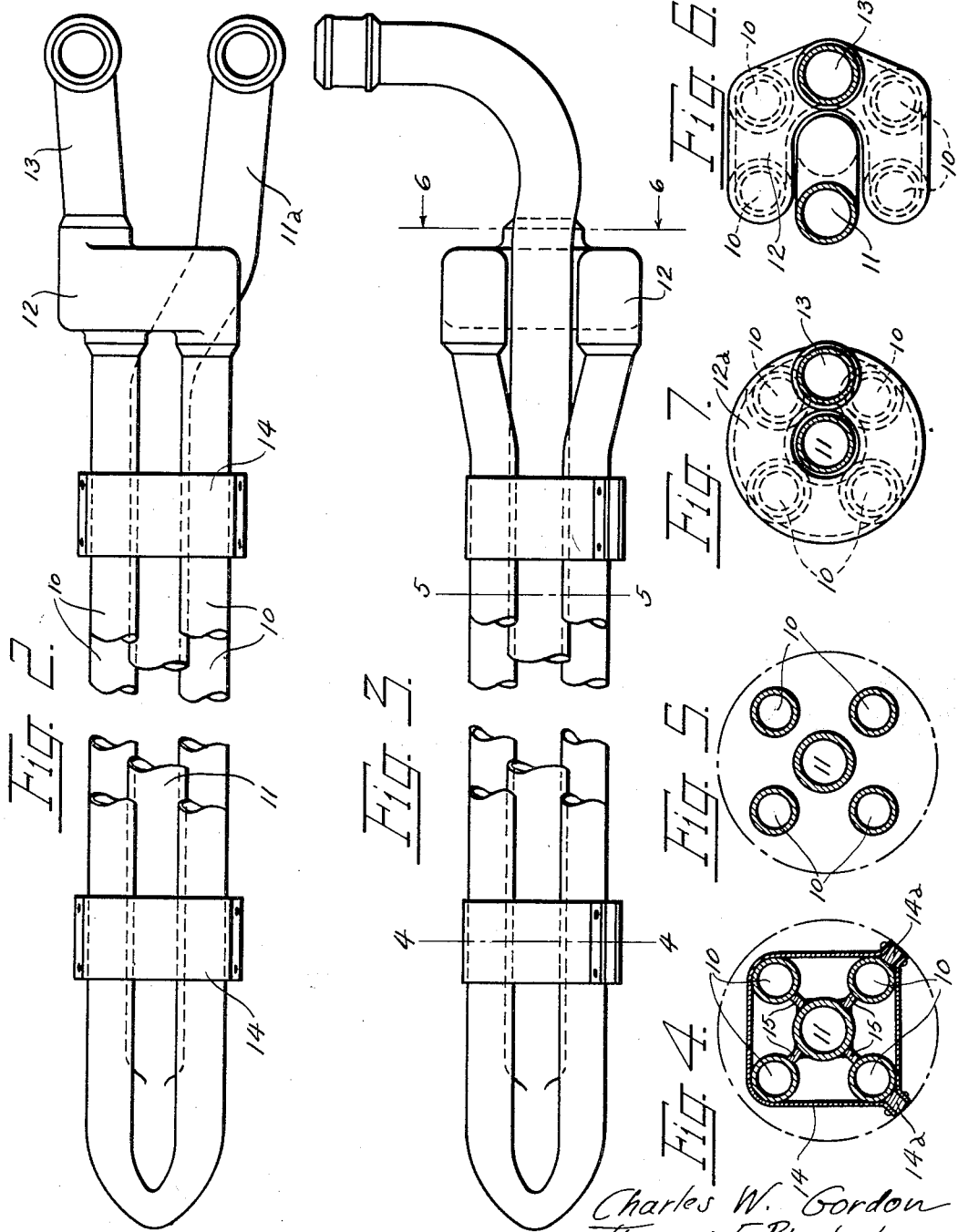

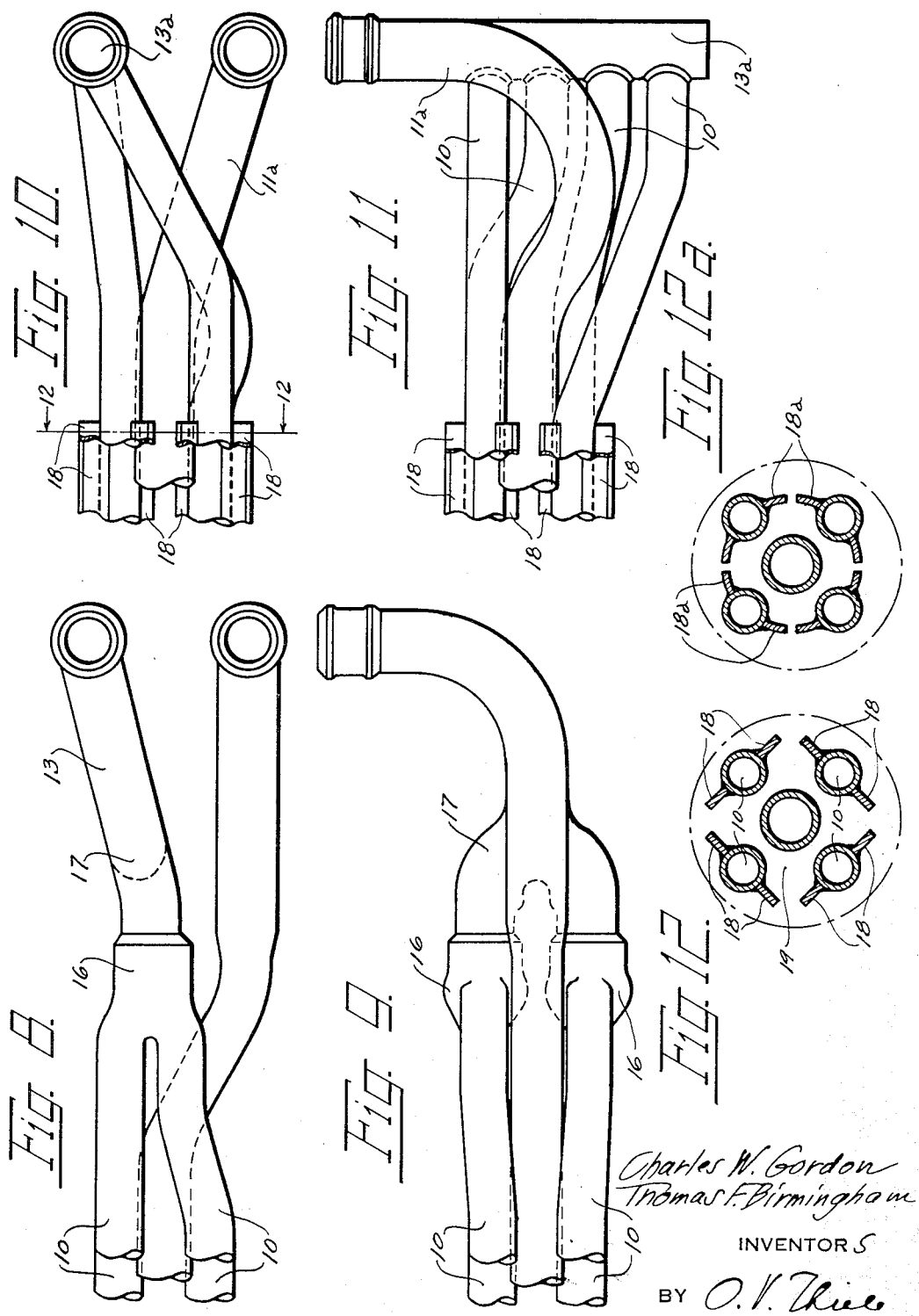

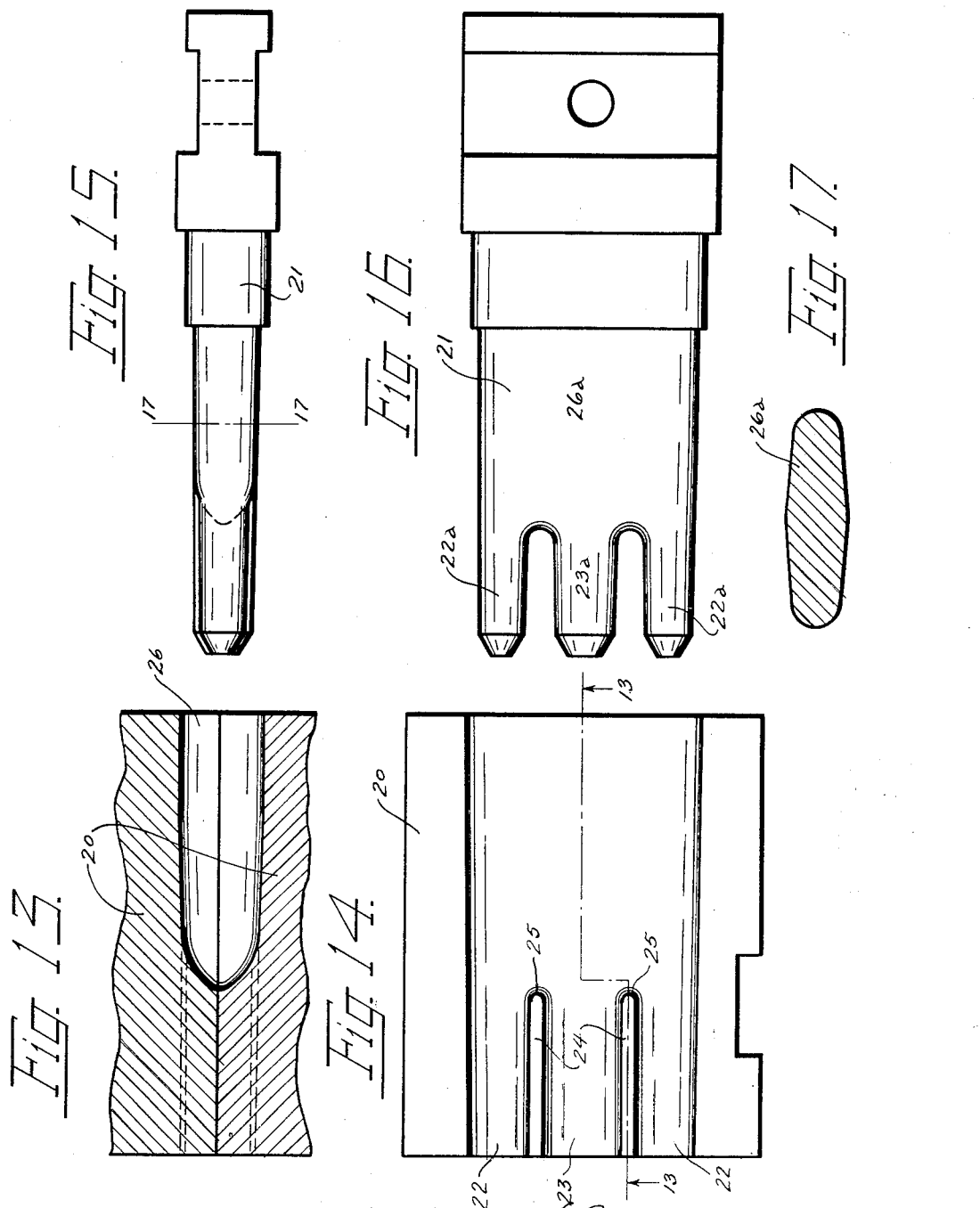

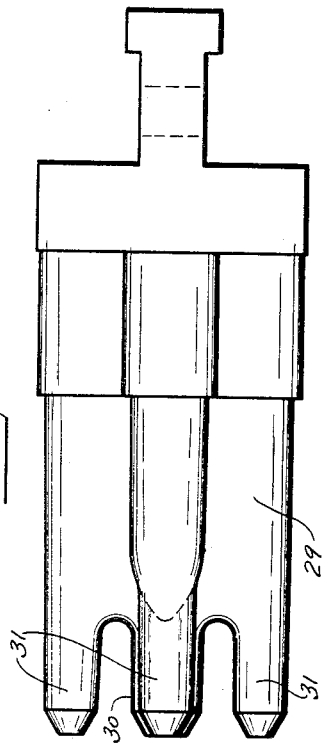
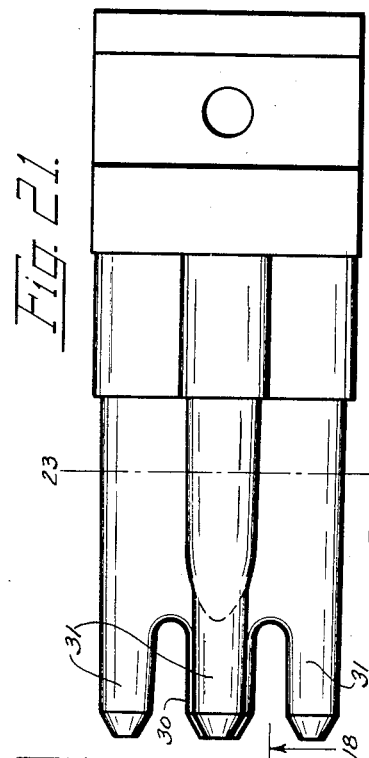
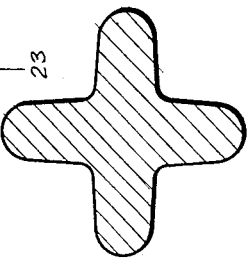
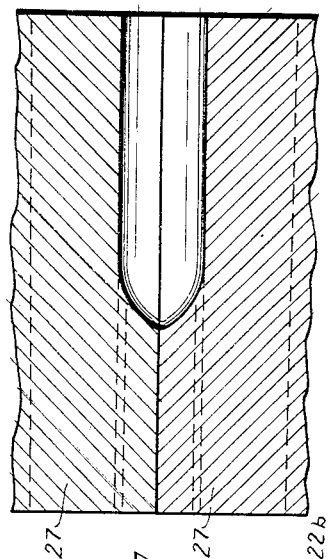
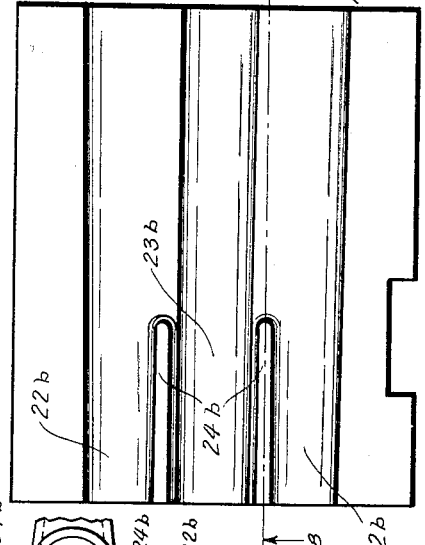
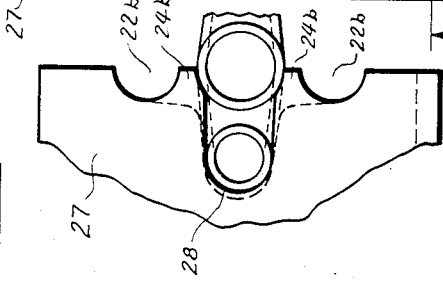

June 26, 1934.    C. W. GORDON ET AL    1,964,051
METHOD OF MAKING TUBULAR SUPERHEATER ELEMENTS
Filed Aug. 8, 1932    7 Sheets-Sheet 6

Charles W. Gordon
Thomas F. Birmingham
INVENTORS

BY O. V. Rice
ATTORNEY

June 26, 1934.　　C. W. GORDON ET AL　　1,964,051
METHOD OF MAKING TUBULAR SUPERHEATER ELEMENTS
Filed Aug. 8, 1932　　7 Sheets-Sheet 7

Charles W. Gordon
Thomas F. Birmingham
INVENTORS
BY O. V. Thiele
ATTORNEY

Patented June 26, 1934

1,964,051

UNITED STATES PATENT OFFICE 1,964,051

METHOD OF MAKING TUBULAR SUPERHEATER ELEMENTS

Charles W. Gordon and Thomas F. Birmingham, Hammond, Ind., assignors to The Superheater Company, New York, N. Y.

Application August 8, 1932, Serial No. 627,874

5 Claims. (Cl. 29—157.4)

The present invention relates to locomotive superheaters of the type comprising tubular elements positioned in the flues leading from the fire box to the smoke box and attached to headers or collectors usually located in the upper part of the smoke box. This general type of superheater has gone into practically universal use and has proved exceedingly beneficial to the operation and economy of the locomotive. While at first difficulties were experienced traceable to the new problems introduced by the higher temperatures of the steam, these have in the course of time been so well overcome that the demand for even higher superheat is insistent. Various modifications of the general type of superheater spoken of above have been suggested with the idea of obtaining these higher degrees of superheat, but most of them have involved some difficulties either in the manufacture of the separate elements composing the superheater or in the operation or maintenance of such elements and none of them have gone into extensive use.

It is the purpose of the present invention to provide a superheater of this type which shall furnish higher temperatures than ordinarily obtained. One of the leading features of the invention is the form of the tubular elements located in the flues. Another feature is the configuration of, and method of fabricating, the end of such tubular element lying in proximity to the fire box. A further feature is the specific form of the tools required for this manufacture. A further feature is the form given the forward end of the separate tubular elements. Other and more detailed objects and features of the invention will be evident from a reading of the following specification.

Figure 25:
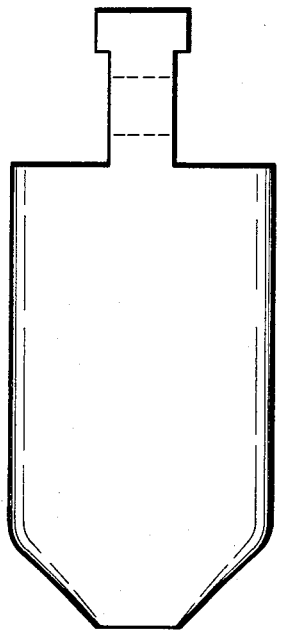
Figure 26:
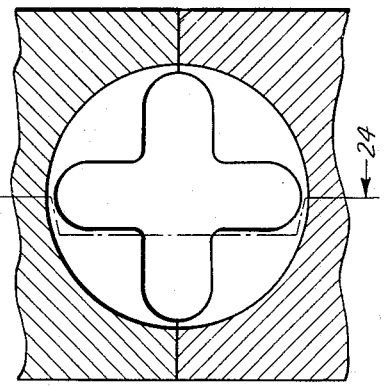
Figure 24:
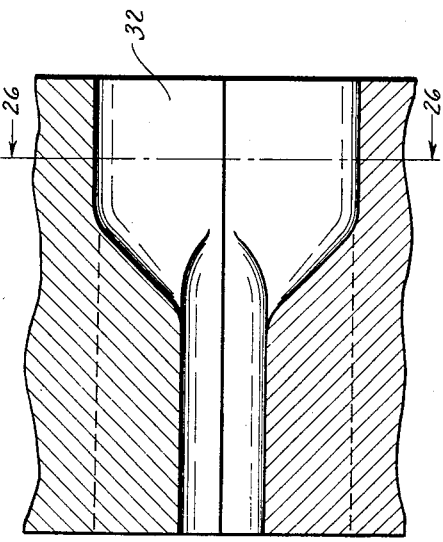
Figure 27:
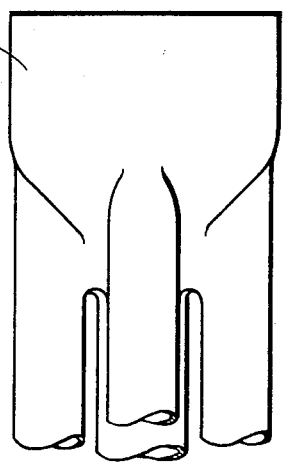
Figure 29:
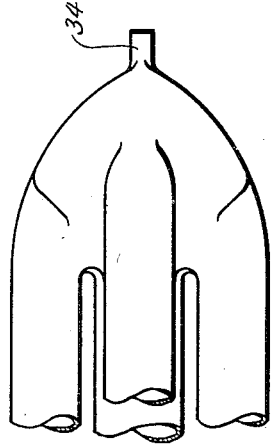
Figure 28:
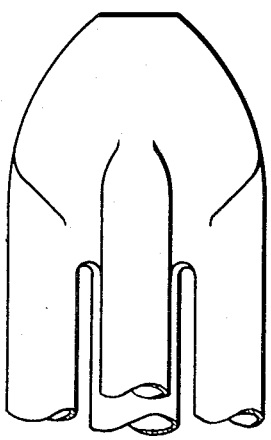
Figure 31:
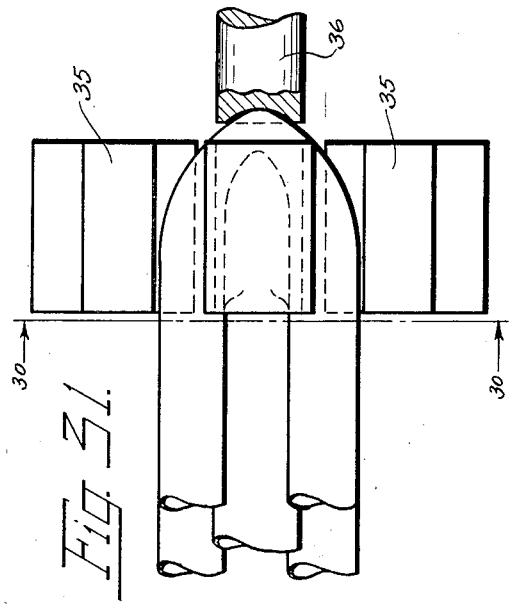
Figure 30:
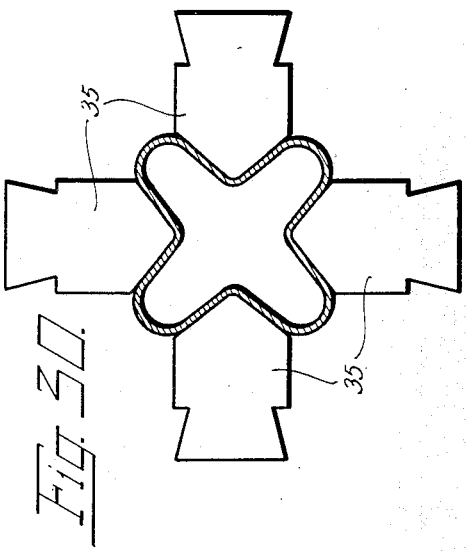

The invention is described in the following specification which makes reference to the drawings filed herewith. In these drawings Fig. 1 shows in vertical longitudintal fragmentary section a locomotive boiler with a superheater in accordance with our invention. Fig. 2 is a top view of one of the tubular elements of the superheater. Fig. 3 is a lateral elevation of such element. Fig. 4, 5, and 6 are sections on the line 4—4, 5—5, and 6—6 respectively of Fig. 3. Fig. 7 is a section similar to Fig. 6 showing a modification. Fig. 8 is a top view of the forward end of an element corresponding to Fig. 2 but showing a modification. Fig. 9 is a lateral elevation of Fig. 8. Figs. 10 and 11 are views corresponding respectively to Figs. 2 and 3, and 3 and 9 of a further modification. Fig. 12 is a sectional view taken on line 12—12 of Fig. 10. Fig. 12a is a view similar to that of Fig. 12 showing a modification. Figs. 13 to 17 are views illustrating the dies for performing the first part of the operation to produce the end of the unit lying in proximity to the fire box. Figs. 18 to 23 are views of the dies for performing the second step in such manufacture. Figs. 24 to 26 show the dies for a third step in such manufacture. Fig. 27 shows the appearance of the incomplete end of such element after the third step has been performed on it. Figs. 28 and 29 show the appearance after subsequent steps and Figs. 30 and 31 show the dies for finally shaping this end of the element.

Referring first to Fig. 1, this figure is intended to show the general appearance and location of the proposed new element. The locomotive, which may be of any usual type, has the usual enlarged flues 1—1 connecting the fire box 2 to the smoke box 3. It is the intention of the present invention to provide an improved tubular superheating element of this kind which, among other things, has the advantage that it may be substituted for existing elements now in service, and for this purpose the location, spacing and number of these enlarged flues may be assumed to be what is usual in these cases. The header or collector 4 is located in exactly the same position in the smoke box as heretofore, and in fact may be assumed to be of the same construction as hitherto. Steam from the steam dome 5 enters the dry pipe 6, preferably by way of separator 7 and is delivered to the header 4. It flows thence through the several superheater elements and is delivered back to the header 4 into chambers out of communication with those which originally delivered it to the tubular elements. Any suitable throttle, such for example as the so-called multiple throttle 8 shown in the drawings, controls the steam flow from the superheater header through the steam pipes 9 (only one showing) to the steam chests of the engines (not shown). In superheaters of this type with the tubular elements in enlarged flues as shown, it is the regular practice to make each tubular element of four pipe lengths connected in series so that the element loops into the flue twice. While, as mentioned above, variations from this practice have been proposed in the past, they have not been accepted by the art. The present invention proposes an element different in some important respects from any heretofore suggested. The form of the element of Fig. 1 is shown on an enlarged scale in Figs. 2 to 6. The unit comprises four tubular branches 10—10 connected in parallel to carry the steam in a direction from the smoke box toward the fire box and a single return tube 11 to carry it in the reverse direction. The forward ends of the branches 10—10 are connected in any preferred manner to a manifold 12. A tubular connecting piece 13 extends from the manifold 12 to the header 4. The forward end of the return pipe 11 is similarly connected to the header 4 by an upwardly bent portion 11a.

In the fire box end the four lengths 10—10 are connected to the return tube 11 by a return bend which will be described in greater detail presently. The manufacture of this return bend and the tools used in such manufacture also constitute an important feature of the invention as stated above and will be described in detail further on.

In transverse section (see Figs. 4 and 5) the branches 10—10 are preferably located symmetrically around the return branch 11. Suitable spacers and supports 14—14 are applied to the unit at one or more points along its length. These supports have feet 14a—14a engaging the lower portion of the flues and holding the elements in proper spaced relation to the flue. Preferably the spacing of the central pipe 11 relative to the four branches 10—10 is assured by supports 15—15 welded to the inner tube 11. These supports 15—15 are suitably applied at the same points as the supports 14.

The manifold 12 is, according to the preferred form shown in Figs. 2, 3 and 6, in the shape of a horseshoe or U. This makes it possible to insert the central tube 11 in proper relation to the manifold. In the variation shown in Fig. 7 the manifold 12a is given a complete circular form. The branch leading from the manifold to the header appears at 13.

Instead of having a manifold 12 or 12a as in Figs. 6 and 7, other means may be resorted to to connect the four tubes 10—10 to the connecting piece 13. Two such means are illustrated in Figs. 8 and 9 and 10 and 11 respectively.

In Figs. 8 and 9 the pipes 10—10 are first connected in pairs to the two connecting Y's 16—16 and these two in turn are connected to the Y 17 which communicates with the connecting piece 13.

In the form of Figs. 10 and 11 the four pipes 10—10 are connected to a vertical piece 13a, the upper end of which connects directly to the header 4.

The tubes constituting the elements may be left as bare tubes or, if desired, they may be provided with fins as more fully described in United States Patent 1,942,676 granted on January 9, 1934, to Arthur Williams. Such a fin arrangement is illustrated in connection with Figs. 10 and 11. It will be understood, however, that it may equally well be applied to the other forms herein described. Fig. 12 is a section of Fig. 10 showing the fins. They are referred to by reference numeral 18—18 and are secured to the tubes 10—10 in any preferred manner. Together with these tubes they enclose a path 19 for products of combustion separated more or less completely from the remainder of the flue. The purpose of providing such a central divided path is to keep this portion of the gases from being cooled by contact with the water cooled walls of the flue and thereby to make it possible to raise the degree of superheat even further than the bare tube unit will raise it.

The fins 18—18 may, instead of being straight as in Fig. 12, be curved as shown at 18a—18a of Fig. 12a. Other variations may also be made as more fully described in said patent by Williams.

Coming now to the manufacture of the peculiar return bend connecting the four pipes 10—10 to the single return pipe 11, the tools for the first step for such manufacture are illustrated in Figs. 13 to 17. They comprise two portions—the split outer die 20—20 and the plunger or "pin" 21. These tools are used to connect the central pipe 11 to two diametrically opposite pipes 10—10. The two split halves 20—20 are each equipped with two semi-circular depressions 22—22 and a larger semi-circular depression 23 between them, the arrangement and sizes of these depressions or grooves being such that when the two halves are properly assembled there are presented three cylindrical openings of such size as to accommodate the two pipes 10—10 and the return pipe 11. These circular openings are separated from each other by the walls 24—24, which extend inwardly from one end of the die but terminate at points 25—25 spaced from the opposite end of the dies. The absence of the walls 24—24 therefore leaves a continuous opening 26 from this opposite die end.

The pin or die 21 has a shape closely similar to that of the hollow interior of the die 20—20 except that it is smaller, so that when it is inserted in the die 20—20, it will be everywhere spaced from such die by a distance substantially equal to that of the wall thickness of the pipes. This die 21 therefore has a portion 26a, shown in cross section in Fig. 17, adapted to enter the space 26 and three fingers 22a—22a and 23a, spaced and sized to enter the three openings 22—22 and 23. Suitable mechanism is provided to cause the die 21 to perform a reciprocating stroke into the die 20—20.

The pipes, which it is desired to unite, are, after being clamped together and suitably heated, placed in the first half 22 of the female die and the other half is then brought into position and the die 21 caused to perform its stroke. This results in connecting the three pipes into a single open ended piece as will be at once understood by those familiar with this art. The pipes are during the stroke split along the sides facing each other and the portions adjacent to such slits are bent outward, those of one pipe abutting forcibly against those of the adjacent pipe and becoming welded to them. It is thought unnecessary to enter into any further explanation of this feature.

To connect the other two pipes 10—10, dies illustrated in Figs. 18 to 23 are used. These dies are in a general way similar to those just described and illustrated in Figs. 13 to 17, but differ from them in that the female portions have spaces to accommodate the pipes 10—10 which have been connected to the central pipe 11 during the first part of the process, and in the pin having five fingers. These spaces are illustrated at 28 in the half-die shown at 27. When the two halves 27—27 are assembled, the partially manufactured piece is located as indicated in Fig. 20. The two pipes 10—10 which are to be united to the partially manufactured piece occupy the spaces 22b—22b. These two depressions 22b—22b are closely similar to the depressions 22—22 of the first described dies. They are each semi-circular and when the die-halves are placed together, form circular cavities of the size to accommodate the pipes 10—10. They are separated from the central space 23b by the walls 24b—24b which terminate at the same distance inward from the end of the die as do the walls 24—24. The pin 29 in this case comprises five fingers or prongs. The central one of these appears at 30 and around it are grouped the four smaller ones 31—31.

A cross section on line 23—23 shows that the pin at this point has a cross shape. The female die has a closely complementary but somewhat larger interior.

In the use of this die the partly manufactured unit and the two pipes which are to be connected to it are, after being suitably clamped together and heated, placed in position and the two halves of the female die are closed. The pin then performs its reciprocating stroke, it being understood that suitable mechanism for this purpose is provided which may be the same as that used in the first part of the manufacture. This stroke results in connecting the second pair of the pipes 10—10 to the structure. The structure after this step has an open end in the shape of a cross. At the four extremities of the cross lie the four outer pipes 10—10 and at the center lies the pipe 11. It remains to close the open end to make the structure a complete functioning one. This closing is performed in two steps, the first of which consists in giving the cross-shaped end a round form and the second of which consists in swaging or drawing this rounded end down to a closure. A further step is subsequently performed to finally shape the return bend.

For the first rounding operation a pair of dies shown in Figs. 24 and 26 is employed. The die shown in Fig. 24 is made up of two halves. It has suitable recesses to take the pipes 10—10 and has an open circular end 32. The plunger shown in Fig. 25 is simply a blunt-nosed cylindrical piece of somewhat smaller size than the opening 32. The incomplete structure having been suitably heated is placed in the die of Fig. 24 and by suitable mechanism the plunger of Fig. 25 is caused to enter the die and to press the walls of the cross-shaped, incomplete structure outward against the walls of the die. The piece, after this operation has been performed, presents the appearance shown in Fig. 27, the end 33 being circular in cross section. An end view of the dies of Fig. 24 is shown in Fig. 26 and will make the construction of this die clear.

To close the circular open end 33 any suitable means may be employed, those which I prefer being a swaging machine of the type disclosed in U. S. Patent No. 1,339,054. It will be understood of course that the piece is suitably heated before this swaging operation is performed. In Fig. 28 the piece is shown partially swaged down to a closure and in Fig. 29 it is shown completely closed. The swaging hammers are preferably of such shape that a small solid piece 34 results which is subsequently clipped off.

The structure is now closed and completely operative. It is desirable, however, when the structure is used as herein described to give it a shape offering less obstruction to the flow of the gases through the flue. If left as shown in Fig. 29 there is an unnecessarily large area on the inside of the return bend and an unnecessarily large obstruction to the gas flow on the outside is offered. It is therefore preferable to force back the walls from those parts where it was made circular in the operation with dies of Figs. 24 to 26 into a cross shape. This is preferably done by dies illustrated in Figs. 30 and 31. The four pieces 35—35 are, by suitable mechanism, moved into the positions shown in Fig. 30 to press the bulging parts of the structure back into a cross shape. The end from which the superfluous material 34 has been clipped is preferably also given a final finish by means of a suitable tool 36.

It will be clear that variations can be made in the superheater element described as well as in the tools and method of manufacture without departing from the spirit of the invention.

What we claim is:

1. The process of connecting a tube end to the ends of four other tubes grouped around it, comprising first connecting to opposite sides of the first tube two of the other tubes by suitably heating the three tube ends, slitting inward from their ends for a distance those of their walls which lie opposite each other, bending outward the portions of the walls adjacent to the slits, and welding the edges of the bent-out portions of the first pipe to the corresponding edges of the bent-out portions of the other two pipes; and next connecting by similar steps the two remaining tubes to the first tube at points between the tubes first joined to the first tube.

2. The process defined in claim 1, the steps by which the first tube is connected to the first two of the four tubes, after they have all three been heated, being simultaneous.

3. The process defined in claim 1, the steps by which the first tube is connected to the first two of the four tubes, after the three have been heated, being simultaneous; and the steps, after heating, by which the remaining two tubes are joined to the first tube being simultaneous.

4. The process defined in claim 1, and further comprising closing the end of the structure produced by the steps recited.

5. The process defined in claim 1, and further comprising closing the end of the structure produced by the steps recited by first rounding the end by exerting pressure against the inside adjacent to the end, next swaging the rounded end to a closed form, and finally shaping the structure by pressure against points on the outside to bring all parts within the space defined by pairs of parallel planes tangent to opposite tubes.

CHARLES W. GORDON.
THOMAS F. BIRMINGHAM.